United States Patent [19]
Baker et al.

[11] 3,831,888
[45] Aug. 27, 1974

[54] AIRCRAFT ENGINE SUSPENSION SYSTEM

[75] Inventors: Sherman F. Baker; Frederick D. Hess, Jr., both of Long Beach, Calif.

[73] Assignee: McDonnell Douglas Corporation, Santa Monica, Calif.

[22] Filed: July 27, 1972

[21] Appl. No.: 275,805

[52] U.S. Cl.................................... 244/54, 248/5
[51] Int. Cl............................................ B64d 27/18
[58] Field of Search ........ 244/54, 53 R, 58, 55, 56; 248/5; 60/39.31

[56] References Cited
UNITED STATES PATENTS

| | | | |
|---|---|---|---|
| 3,006,587 | 9/1961 | Jumelle et al............................ | 248/5 |
| 3,085,773 | 4/1963 | Anstrom et al......................... | 248/5 |
| 3,327,965 | 6/1967 | Bockrath ............................... | 244/54 |
| 3,448,945 | 6/1969 | Ascani, Jr............................... | 244/54 |
| 3,561,707 | 2/1971 | Strock.................................... | 248/5 |

Primary Examiner—Trygve M. Blix
Assistant Examiner—Sherman D. Basinger
Attorney, Agent, or Firm—Robert O. Richardson; Walter J. Jason; Donald L. Royer

[57] ABSTRACT

A three-point monoball suspension system for attaching engine pylons to aircraft supporting structure. Two of the three points are located forward of the wing front spar. The lower forward point is close to the wing lower plating and the upper forward point is close to the wing upper plating. The aft point is located as far aft as possible to be contained in the pylon and attaches to the wing lower plating and internal wing support structure.

5 Claims, 7 Drawing Figures

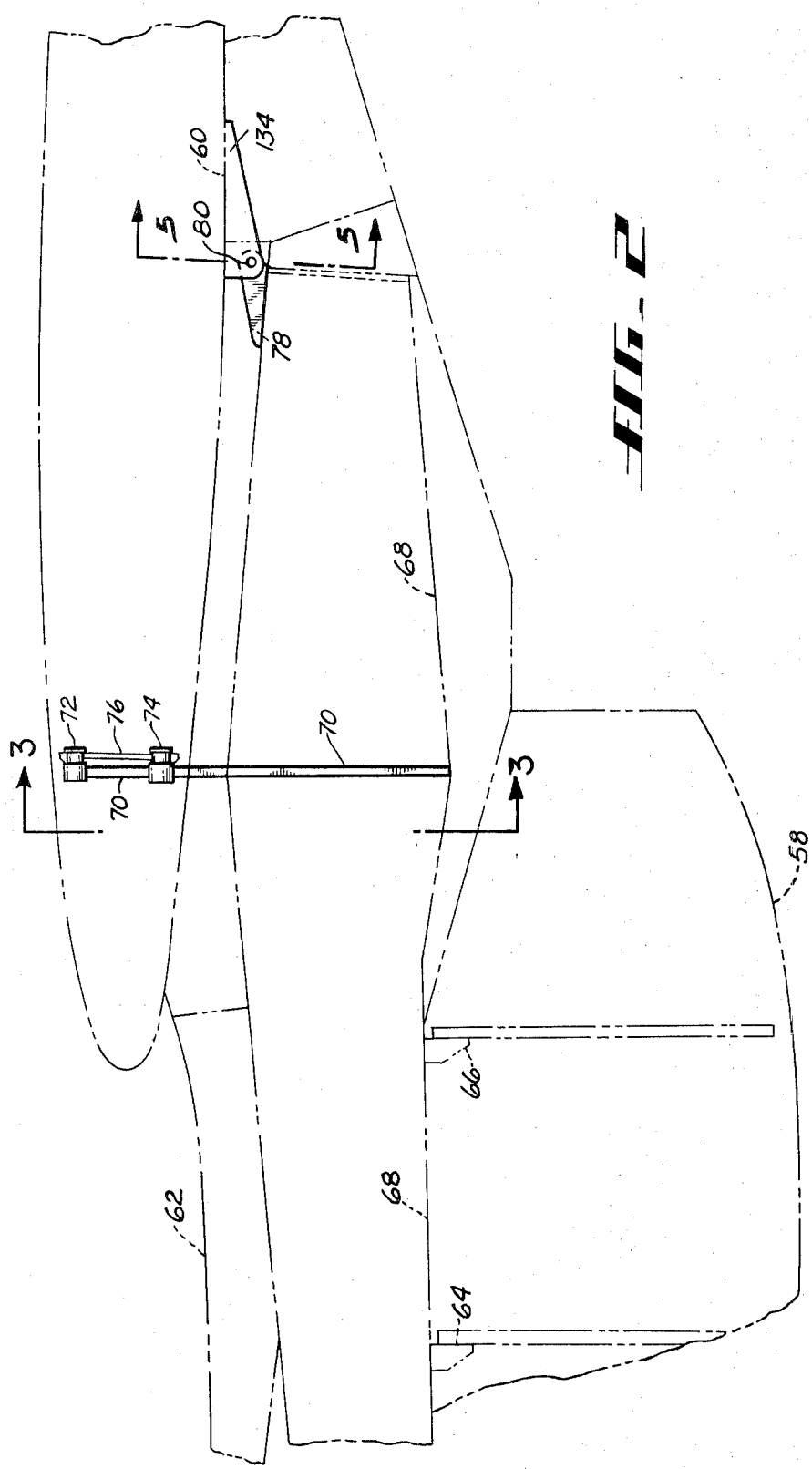

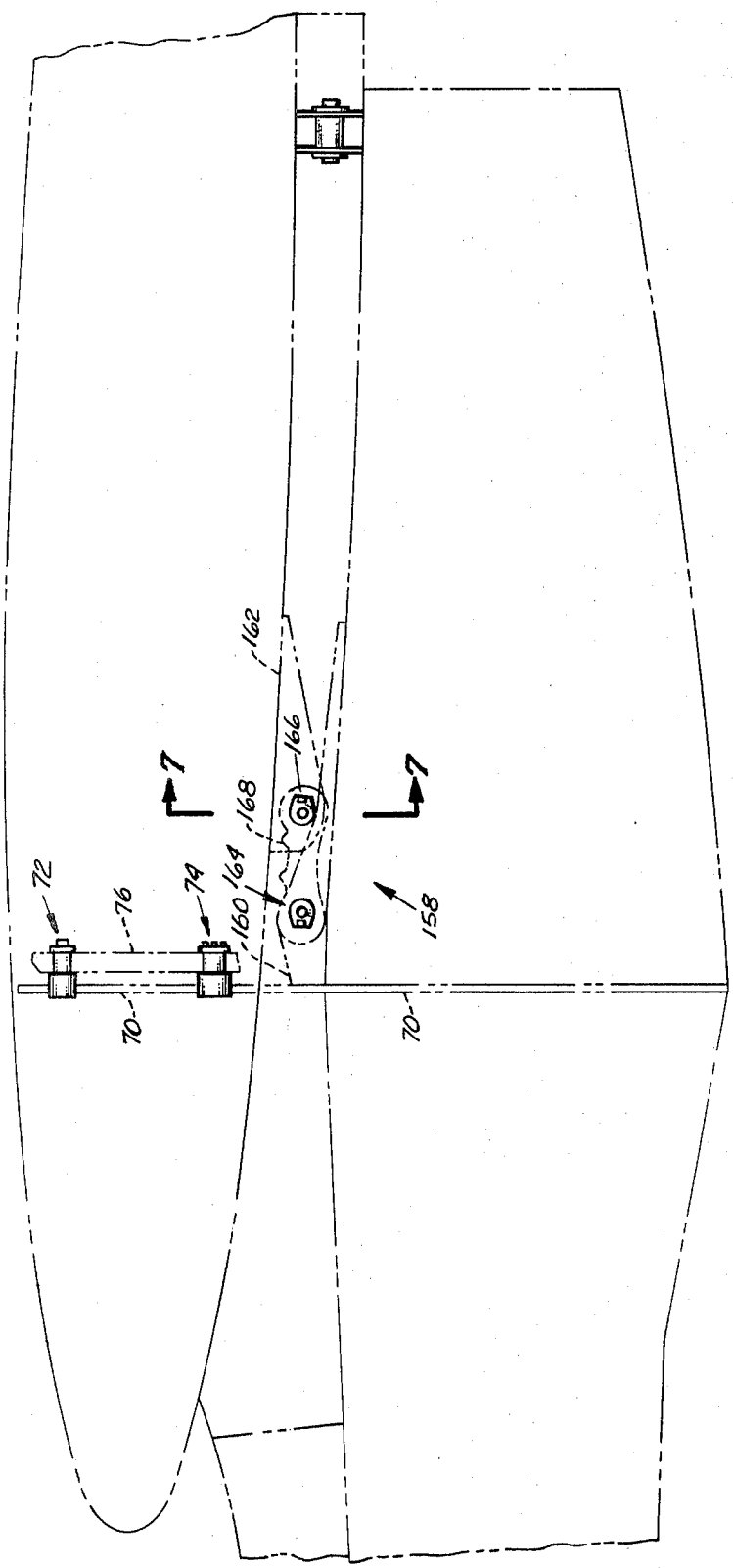
FIG_6

AIRCRAFT ENGINE SUSPENSION SYSTEM

BACKGROUND OF THE PRESENT INVENTION

Aircraft engines when supported externally from the wing require a pylon consisting of a stiffened box structure capable of resisting loads imposed upon it by the engine in flight. Due to the aerodynamic thinness requirements of a pylon structure, these loads cause the pylon to flex and bend relative to the wing. This tendancy to flex, particularly sideways, has, in past design, been responsible for fatigue cracks in pylon structure and wing support structure. Also, the thinness requirements impose very high loads on attach points when these points are limited in spacing because of the thinness of the pylon. A partial solution to this problem has been to use a multiplicity of attach points to distribute these high loads. However, this has not been satisfactory because it also increases maintenance and inspection problems.

For maintenance and inspection, fasteners at the attach points must be removed and because of these high loads on the attach points, fretting and corrosion occurs, resulting in extreme difficulty in the removal of these fasteners. Often these fasteners, particularly when subjected to high loads, have to be drilled out or forced out such as with a sledge hammer which can result in damage to the attach points on the pylon and wing structure. When this occurs, the attach points have to be reworked and oversize fasteners installed. Obviously, this results in very expensive inspection and excessive down time for the maintenance of the aircraft.

SUMMARY OF THE PRESENT INVENTION

Briefly the difficulties of fastener removal, due to fretting and corrosion, and structural fatigue cracks at support points are overcome in the present invention by permitting motion between the pylon and wing through the use of monoball bearings at three attach points. These attach points form a suspension system which resists vertical, side and thrust, and associated torque and bending loads. A drag link also may be provided as an alternate thrust reaction path if thrust through the monoball bearings is not considered desirable.

The three attach points are near the wing lower plating line, the wing upper plating line, and at the lower wing plating line as far aft as possible within the pylon. The first two attach points are forward and close to the wing front spar. These two points thus located transfer their loads directly into the wing spar bending members and the wing plating through the large couple created by the spacing between the two points. These two points are loaded from the pylon through a beam which is an integral part of the pylon protruding vertically into the wing.

The third point completes the suspension system by resisting side and vertical bending loads. Thrust forces from the engine also react through the pylon at this point. In an alternate arrangement engine thrust can also be resisted through an added link attached from the pylon to the wing plating if thrust through the monoball suspension is not considered desirable.

The present invention permits pylon flexibility without the accompanying fatigue crack problem. Also, the monoball bearings, because of their large size, are subjected to such low bearing stresses that teflon liners can be utilized, thus eliminating lubrication maintenance. Also because of the low bearing stresses the fretting and corrosion has been reduced to a minimum, simplifying removal of the fasteners for pylon interchangeability and maintenance and inspection.

BRIEF DESCRIPTION OF THE DRAWINGS

FIG. 2 is a side elevational view showing the relationship of the engine pylon, wing and attach points.

FIG. 6 is an enlarged side elevational view similar to FIG. 2 but modified to include the optional thrust link and with the rear attach point rotated 90°.

DETAILED DESCRIPTION OF THE DRAWINGS

Figure 1:
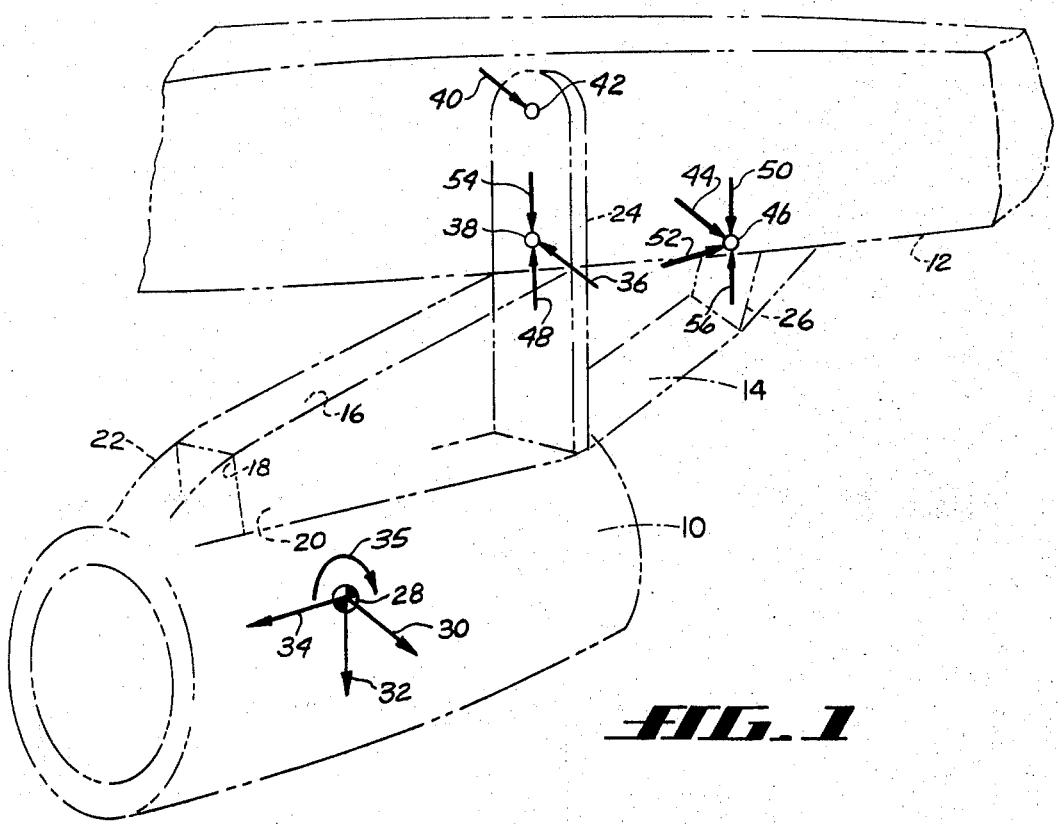
FIG. 1 is an isometric force diagram of the suspension system.

Referring now to the force diagram in FIG. 1, there is shown an aircraft engine 10 affixed to wing 12 by a pylon 14. This pylon consists of a box-like structure of webs 16, caps 18, side plating 20, fairing 22 and attach members 24 and 26. Except for the attach members, the rest of the pylon is of conventional design.

The center of gravity of engine 10 is shown at point 28, substantially forward and below the wing 12. Forces exerted at this point are side load shown by arrow 30, vertical load due to gravity shown by arrow 32, and thrust load shown by arrow 34. Engine torque exerts a rotary force shown by arrow 35. These forces must be counteracted by forces on attach members 24 and 26. Thus, side load 30 and torque 35, is reacted by force 36 on lower attach point 38 on attach member 24. This, in turn, to maintain equilibrium, requires opposing forces 40, on upper attach point 42 on attach member 24 and, 44, on attach point 46 on rear attach member 26.

Gravity force 32 on engine 10 is reacted by a force 48 on load point 38 and an equilibrium force 50 on load point 46. Thrust force 34 is reacted by force 52 on rear attach point 46. To maintain equilibrium, force 56 on attach point 46 are also required.

It should be understood that the forces on center of gravity point 28 also may be in the reverse direction, in which case the forces on the attach points will also be reversed. However, for purposes of simplicity, these are not shown.

While reaction forces have always been necessary in pylons for supporting engines, the pylon structure of the present invention results in the advantages set forth.

Referring now to FIG. 2 there is shown an engine 58 attached to wing 60 through pylon 62. The engine is attached to the pylon at points 64, 66 on pylon frame member 68. Attach member 70 extends from frame member 68 vertically up into the wing 60 and is affixed thereto at vertically spaced attach points 72, 74. These attach points are vertically spaced substantially farther apart to provide a longer moment arm than that provided by the previous horizontally spaced attach points whose spacing heretofore was limited by the pylon width.

Attach member 70 is mounted forward of wing front spar 76 and attach member 78 with its attach point 80 is mounted as far rearwardly as possible on the pylon 62 to provide for a maximum moment arm between the two attach members.

With these larger moment arms, the side forces at the attach points are reduced in magnitude, thereby subjecting the structure to less stress and thus increasing its expected service life.

Reaction force magnitudes due to vertical forces on engine 5 are also reduced due to the large moment arm between attach members 70 and 78 between the pylon 62 and wing 60.

The thrust force of engine 58 is borne principally by attach point 80 on the rear attach member 78. However, because the thrust force is below the attach point 80, vertical equilibrium reaction forces are generated at attach point 74 of forward attach member 70 and at rear attach point 80. Here again the large moment arm between attach members 70 and 78 reduces the magnitude of these reactive forces. Thus less stress means longer service life.

Figure 3:
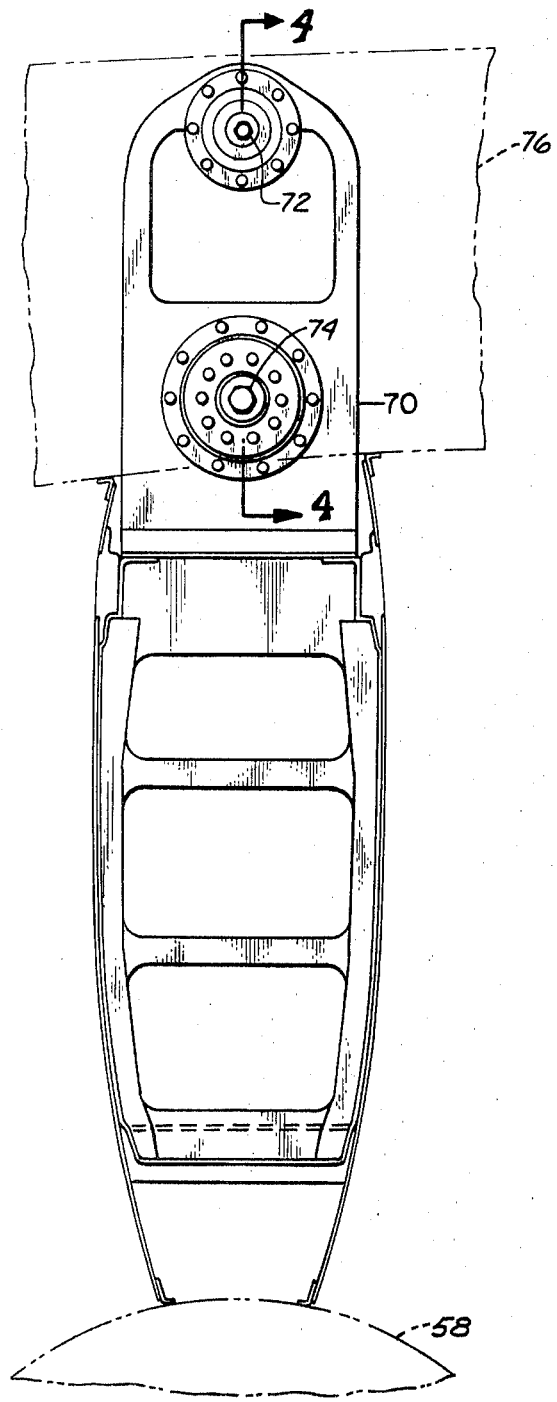
FIG. 3 is a front elevational view along the line 3—3 of FIG. 2.

A front view of the structure of front attach member 70 with its attach points 72, 74 is shown in FIG. 3. This is a beam which is an integral part of the pylon structure. Since its only attachment to spar 76 of the wing is through points 72 and 74, and these points are equiped with monoball bearings, the inherent flexibility of the pylon does not result in structural fatigue cracks.

Figure 4:
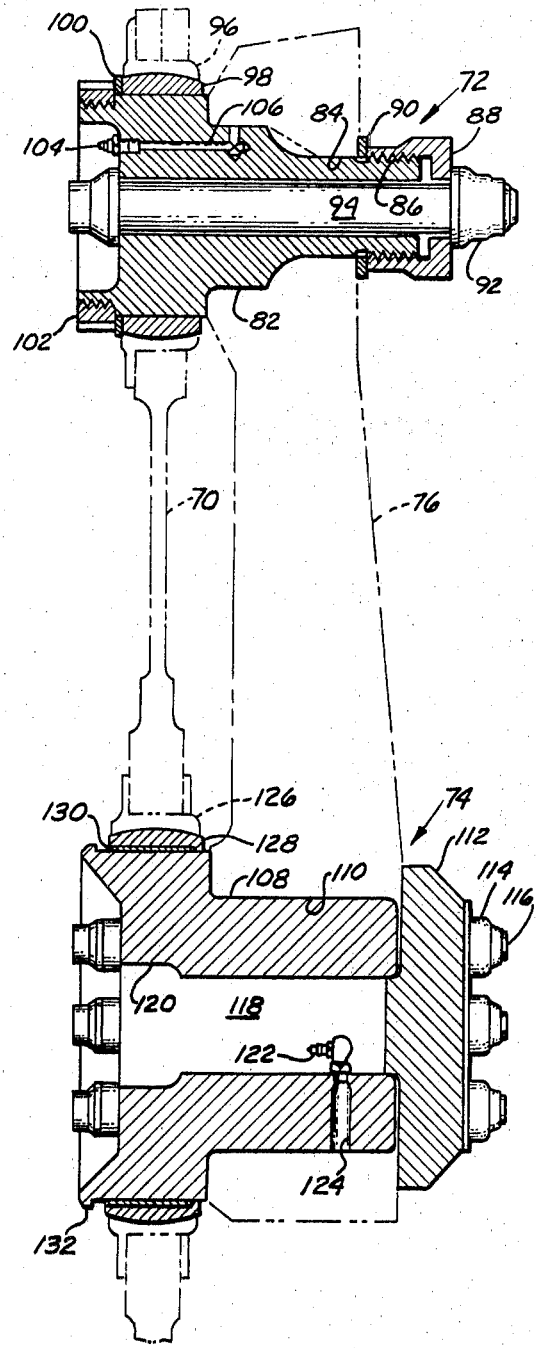
FIG. 4 is a side elevational view of the front attach points along line 4—4 of FIG. 3.

The structural composition of attach points 72 and 74 are shown in section in FIG. 4. Attach point 72 includes a plug 82 adapted for insertion into an opening in spar 76. This plug is threaded on inner end 86 and is held in place with a nut 88 and washer 90. A failsafe nut and bolt 92, 94 passes through the center to retain the plug 82 and nut 88 as assembled. Attach member 70 has a monoball bearing outer race 96 attached to it. The inner race 98 of the monoball bearing fits over plug 82 where it is retained by nut 102. Grease fitting 104 and passage 106 permit lubrication between the plug 82 and the spar 76 to prevent fretting and to facilitate removal of the plug.

Attach point 74 includes a plug 108 adapted to fit within opening 110 in spar 76. This plug is retained by plate 112 positioned on the opposite side of the spar 76. A plurality of nuts and bolts 114, 116 retain the plug 108 and plate 112 as assembled and perform the failsafe feature. Plug 108 has a central bore 118 with a hexagonal recess 120 for application of a wrench to facilitate removal of the plug. Grease fitting 122 and passage 124 permit lubrication between plug 108 and the spar 76 to prevent fretting and to facilitate removal of the plug.

Attach member 70 has a monoball bearing outer race 126 attached to it. The inner race 128 has an inner sleeve 130 bearing on plug 108 to facilitate fore and aft slippage as beam 70 flexes under thrust loads and vertical loads. Plug 108 has an outer rim 132 to prevent the inner race from coming off the plug accidentally.

Figure 5:
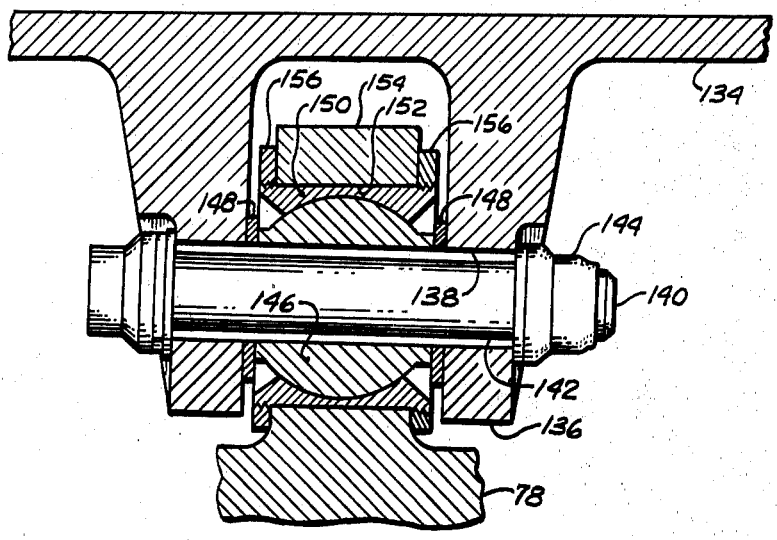
FIG. 5 is a front elevational view of the rear attach point taken along the line 5—5 in FIG. 2.

FIG. 5 shows a front elevational view of the rear attach member 78 where it is connected to a wing mounting bracket 134. This bracket has a clevis 136 with holes 138 adapted to receive a bolt 140 and sleeve 142. Nut 144 completes the fastening. Fitted over sleeve 142 and within clevis 136 is a monoball bearing inner race 146 sandwiched between washers 148. The monoball outer race 150 fits within an opening 152 in lug 154 on attach member 78. Retaining nuts 156 are threadedly mounted on outer race 150 on either side of lug 154 and serve as side plates to resist side loads.

FIG. 6 shows an alternate form wherein thrust loads do not pass through the rear attach point 80, thereby permitting its rotation by 90° about a vertical axis, to more effectively resist the side loads. In this manner the bolt 140 will be along the axis of the pylon and washers 148 and nuts 156 are deleted. Instead of thrust, the monoball bearing resists only side loads and vertical loads. (Good engineering practice suggests that principle loads be normal to the axis of rotation of the bolt passing through a monoball bearing.)

The drag link structure 158 absorbs the thrust forces from the engine when the rear attach point 80 has been modified as just suggested. This structure includes a clevis 160 on pylon 68 and a clevis 162 on wing 60. Each clevis has a monoball bearing connection 164 and 166 with a connecting link 168. This link permits side sway of the pylon under side forces and vertical movement under vertical forces.

Figure 7:
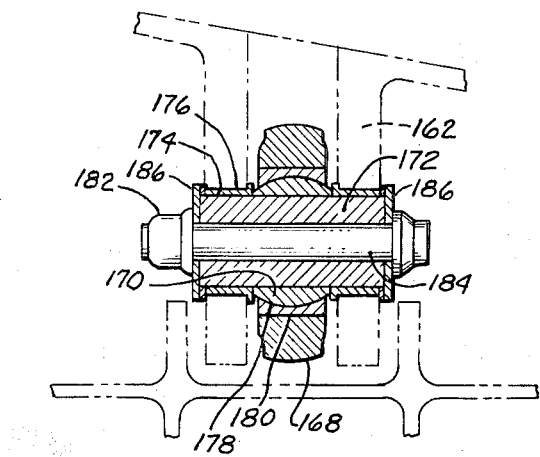
FIG. 7 is a front sectional view of the thrust link along line 7—7 in FIG. 6.

As shown in FIG. 7, the monoball inner race 170 is fitted over sleeve 172 within clevis 162 and is sandwiched between shoulder bushings 174 within openings 176 in the clevis. The monoball outer race 178 is swaged into opening 180 in link 168. Nut and bolt 182, 184 and washers 186 provide the failsafe structure for the connection.

Having thus described illustrative embodiments of this invention, other variations will occur to those skilled in the art and it is to be understood that these modifications are to be considered as part of the invention as set forth in the following claims.

What we claim is:

1. An aircraft engine suspension system comprising:

a pylon having an engine attached thereto,
said pylon having a pair of attach members thereon for attachment to the wing of said aircraft, the first of said attach members having upper and lower vertically spaced attach points for connection to said wing forward of the front spar of said wing,
said upper attach point being in close proximity to the wing upper plating and said lower attach point being in close proximity to the wing lower plating, the second of said pair of attach members being spaced rearwardly of said first member and mounted at the rear end of said pylon, said second member having an attach point for connection to said wing,
said attach points having monoball bearings mounted thereat, said bearings at said upper and said lower attach points having pivotal axes substantially parallel with the axis of said engine, said bearing at said second attach member having a pivotal axis substantially normal thereto.

2. An aircraft engine suspension system as in claim 1 wherein the monoball bearing comprising said lower attach point has its inner race slidably mounted on a plug attached to said wing.

3. An aircraft engine suspension system as in claim 1 wherein the monoball bearing at the attach point on said second member has side plates thereon to react to side loads imposed thereon.

4. An aircraft engine suspension system as in claim 1 wherein the monoball bearing at the upper attach point on said first attach member is retained on a plug on said wing by a nut threadedly inserted thereover.

5. An aircraft engine suspension system comprising:

a pylon having an engine attached thereto,
said pylon having a pair of attach members thereon for attachment to the wing of said aircraft, the first of said attach members having upper and lower vertically spaced attach points for connection to said wing forward of the front spar of said wing,
the second of said pair of attach members being spaced rearwardly of said first member and mounted at the rear end of said pylon, said second member having an attach point for connection to said wing,
said attach points being pivotal points, the pivotal points on said first attach member having an axis substantially in parallel with the axis of said engine and the attach point on said second member having an axis substantially normal thereto.

* * * * *